July 25, 1944. W. W. SLOANE 2,354,336
LOADING MACHINE
Original Filed June 25, 1940 2 Sheets-Sheet 2
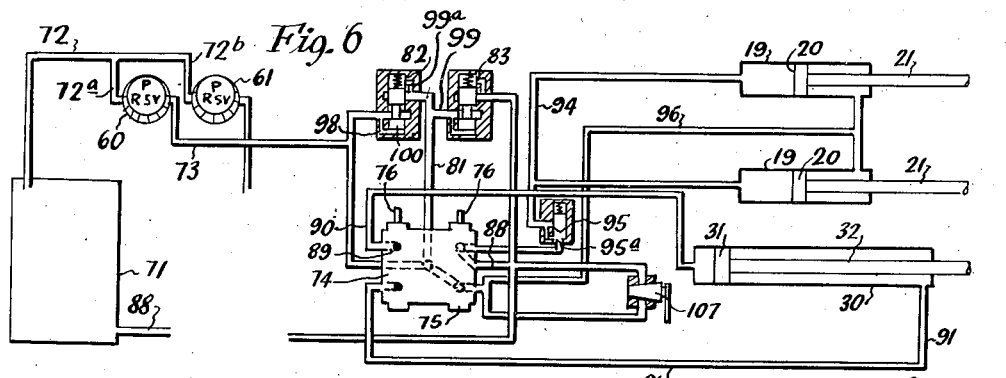
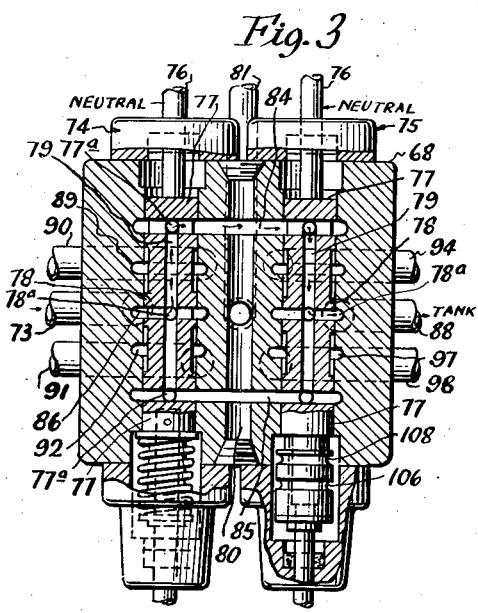
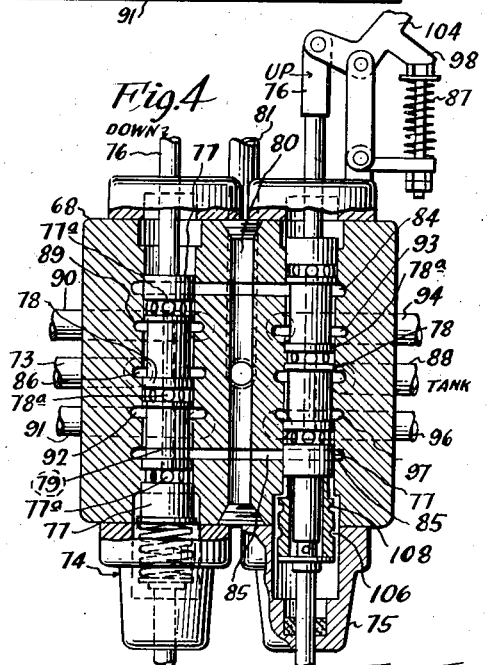
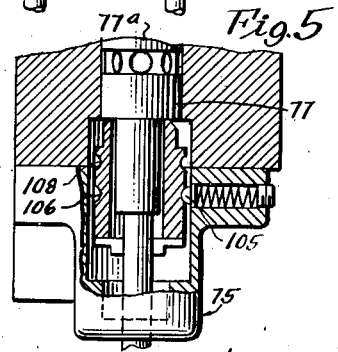
INVENTOR
William W. Sloane
Clarence F. Poole
ATTORNEY Patented July 25, 1944

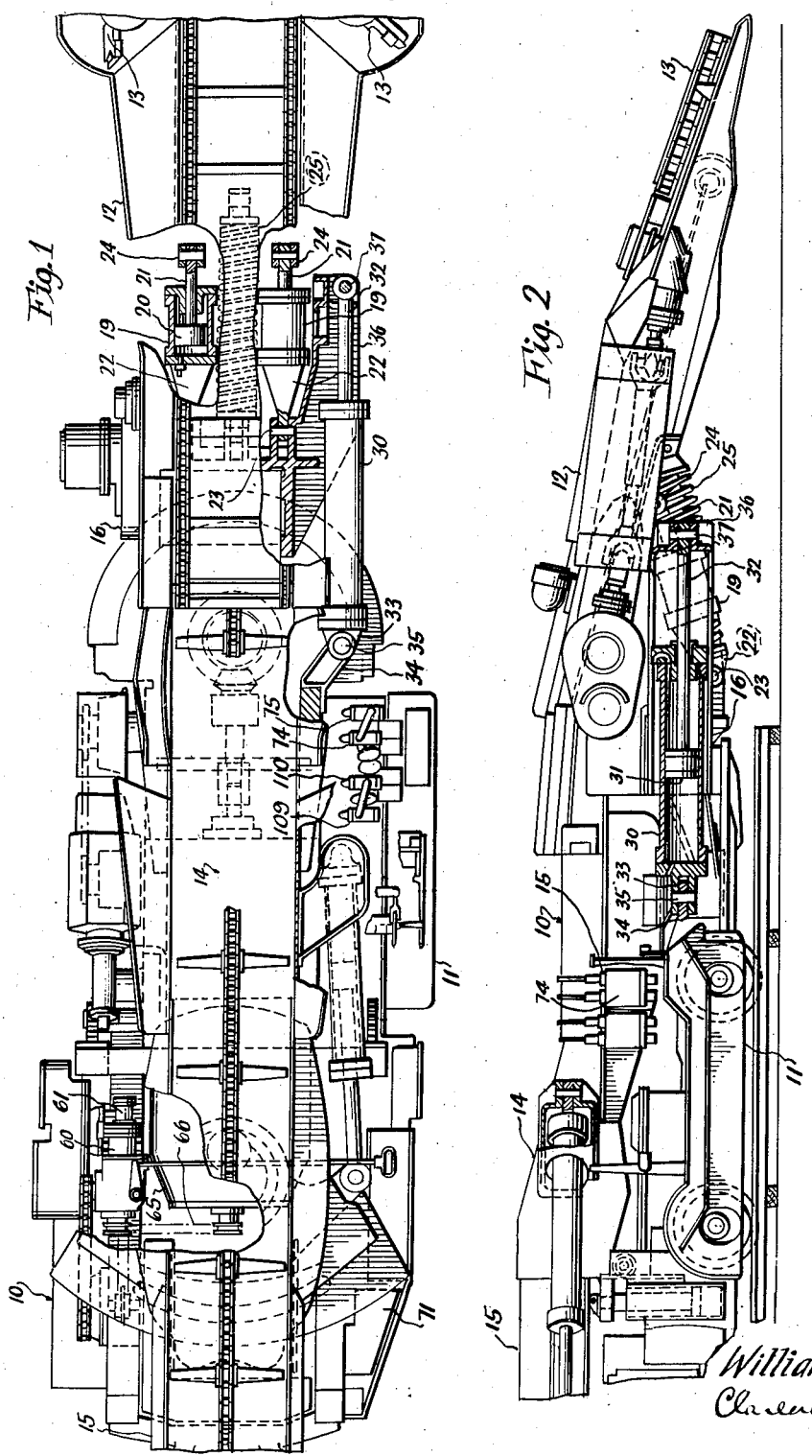

2,354,336

UNITED STATES PATENT OFFICE 2,354,336

LOADING MACHINE

William W. Sloane, Chicago, Ill., assignor to Goodman Manufacturing Company, Chicago, Ill., a corporation of Illinois Original application June 25, 1940, Serial No. 342,331. Divided and this application April 17, 1943, Serial No. 483,441

7 Claims. (Cl. 198—7)

This invention relates to improvements in loading machines, and more particularly relates to an improved fluid pressure operating and controlling system particularly adapted for use with a loading machine of the type operable in confined spaces, such as mines underground.

The principal object of my invention is to provide a new and improved form of loading machine arranged to afford ease and convenience of manipulation and control, particularly with relation towards operation in confined spaces, such as mines.

A more specific object of my invention is to provide a new and improved form of loading machine, so arranged that the elevating conveyer may be used for lifting the front end of the machine about the rear track wheels for rerailing the machine and including a novel arrangement whereby the elevating conveyer may float along the ground when loading or when moving along the track wheels during transportation.

This application is a division of application Serial No. 342,331, filed June 25, 1940.

Other objects of my invention will appear from time to time as the following specification proceeds and with reference to the accompanying drawings wherein:

Figure 1 is a fragmentary plan view of a loading machine having one form of fluid pressure actuating and control system constructed in accordance with my invention embodied therein, with certain parts broken away and certain other parts shown in section;

Figure 2 is a fragmentary view in side elevation of the loading machine shown in Figure 1, with certain parts broken away and certain other parts shown in longitudinal section;

Figures 3 and 4 are detail sectional views of the control valves utilized in the fluid pressure system, showing the valves in different operating positions;

Figure 5 is a fragmentary detail sectional view showing certain details of one of the control valves; and Figure 6 is a fragmentary diagrammatic view of a part of the fluid pressure system, showing the valves in position to permit floating movement of the elevating conveyer.

In the drawings a loading machine 10 of the track mounted type is provided. Said loading machine is particularly adapted for gathering and loading coal in mines underground and is constructed along lines somewhat similar to the machine illustrated in Patent No. 2,201,334, which issued on may 21, 1940, to Frank Cartlidge, so will not herein be shown or described in detail excepting as to the parts thereof which form the basis of my present invention.

The loading machine 10 includes generally a track mounted truck 11 having a forwardly projecting elevating conveyer 12 pivotally mounted on the forward end thereof, for movement about a horizontal transverse axis spaced above said truck, and for movement about a vertical axis disposed forwardly of the forward truck wheels. Gathering elements 13, 13 of the usual chain and gathering arm type extend along each side of the forward end of said elevating conveyer and project forwardly of the forward end thereof. A receiving conveyer 14 is disposed beneath the discharge end of said elevating conveyer and is provided with a laterally swingable discharge end 15, adjustable to discharge material to either side of or directly behind said loading machine.

The elevating conveyer is transversely pivoted on a swinging frame 16, which is mounted on the forward end of the truck 11 for movement about a vertical axis. Said elevating conveyer is vertically moved about its axis of horizontal pivotal connection to said swinging frame by means of a pair of fluid pressure cylinders 19, 19 having pistons 20, 20 mounted therein, with piston rods 21, 21 extensible therefrom. As herein shown, each of said cylinders is provided with a rearwardly projecting portion 22 transversely pivoted on the horizontally swingable frame 16 by means of a pivotal pin 23. The piston rods 21, 21 projecting from the cylinders 19, 19 have pivotal connection at their forward ends with the underside of said elevating conveyer, by means of pivotal pins 24, 24. A compression member 25 is interposed between said frame and the central underportion of said elevating conveyer, to cushion said elevating conveyer during vertical adjustment thereof.

A fluid pressure cylinder 30, having a piston 31 therein, with a piston rod 32 projecting from said piston, is provided to laterally swing the elevating conveyer 12. Said cylinder is provided with a rearwardly projecting portion 33 which is pivotally connected with a bracket 34, projecting from the frame for the truck 11, by means of a vertically disposed pivotal pin 35. Said piston rod is pivotally connected at its forward end with a forwardly projecting portion 36 of the horizontally swingable frame 16, by means of a pivotal pin 37.

The fluid pressure actuating system for raising or lowering the forward end of the elevating conveyer and for swinging it from side to side will now be described. Pressure in said system is effected by means of a pair of fluid pressure pumps 60 and 61, the pump 61 serving to provide fluid under pressure for the fluid pressure actuating devices for the discharge conveyer 14, in a manner which is not herein shown or described since it is no part of my present invention. Said pumps may be of any well known type and are each herein shown as being of a well known rotary sliding vane type of pump. Said pumps, as herein shown, are driven from a motor 65 through a chain and sprocket drive 66 in a manner which will not herein be shown or described since it is no part of my present invention.

The suction sides of the pumps 60 and 61 are connected with a fluid storage tank 71 by means of a pipe 72 and branch pipes 72a and 72b. A fluid pressure pipe 73 leads from the pressure end of the pump 60 to a pair of control valves 74 and 75, herein shown as being open center valves of the piston type and mounted in a single block 68. Said valves are adapted to control the admission of fluid under pressure to the head and piston rod ends of the fluid pressure cylinders 19, 19, which serve to raise or lower the elevating conveyer, and to a cylinder 30 which serves to swing said elevating conveyer laterally.

The valves 74 and 75 are arranged to reverse the direction of flow of fluid in the pipes leading to the cylinders 30 and 19, 19, respectively, thus permitting one valve to control the admission and exhaust of fluid to and from the head and piston rod ends of the cylinder 30, and permitting the other valve to control the admission and exhaust of fluid under pressure to and from the piston rod ends of the cylinders 19, 19. The passageways in said valves are also interconnected so that both valves may be operated simultaneously, to facilitate the operation of the loading machine by elevating or lowering the gathering element and at the same time swinging it to one side or the other. The fluid connections between said valves are also so arranged that fluid exhausted from one cylinder or pair of cylinders will operate the other cylinder or pair of cylinders, thus simplifying the piping arrangement and the control for operating the pistons in said cylinders.

Referring now in particular to Figures 3, 4 and 5, and the valves 74 and 75, said valves are herein shown as being balanced piston valves of the open center type and are each of a similar construction, so like part numbers will be applied to like parts of each valve, wherever practical. The valve 74 includes a plunger slidably mounted in the block 68 for said valves and having a pair of spaced apart aligned end pistons 77, 77 and an aligned intermediate piston 78 formed integral therewith. A valve stem 76 projects from said plunger. The outer pistons 77, 77 and the intermediate piston 78 are grooved intermediate their ends. Openings 77a, 77a lead from the grooves in the pistons 77, 77 to a passageway 79 extending along the center of said plunger. The intermediate piston 78 is likewise grooved and the groove between the lands of said piston is provided with openings 78a, 78a, leading to the passageway 79.

The block 68 is provided with a passageway 80 which extends parallel to the plungers of the valves 74 and 75 in the space between said plungers, to connect opposite ends of said valves together. A pipe 81 has connection with said passageway. Said pipe leads to the exhaust side of a relief valve 82, and the pressure side of a relief valve 83, connected in series with said first mentioned relief valve. The purpose and operation of said relief valves will hereinafter more clearly appear as this specification proceeds.

The passageway 80 is connected with the valves 74 and 75 by means of an end passageway 84 extending transversely of the passageway 80 and an opposite end passageway 85 extending parallel to said first mentioned end passageway.

Fluid under pressure enters the valve 74 through the pipe 73. When the two valves are in a neutral position as shown in Figure 3, fluid under pressure will enters the valve 74 through a port 86 and from said port will pass through the openings 78a, 78a, to and through the central passageway 79 and through the openings 77a, 77a in the pistons 77, 77. From there it will pass through the passageways 84 and 85 to and through the openings 77a, 77a, in the pistons 77, 77 for the valve 75, and out through the openings 78a, 78a of said valve to the tank 71, through a pipe 88.

The valve 75 differs in construction from the valve 74 in that a spring actuated plunger 87 is provided to engage a foot 98 of an operating lever 104 of said valve, to tend to urge the valve stem 76 of said valve to a down position (see Figure 4). A detent 105 is provided at the lower end of said valve and is adapted to engage a groove 106, to hold said valve in a neutral position against the spring actuated plunger 87. Another groove 108 is adapted to be engaged by the detent 105, for holding said valve in an extreme down position (see Figure 5).

When the stem of the valve 74 is in an extreme in or down position and the stem of the valve 75 is in an extreme up or out position, fluid will enter the valve 74 through the pipe 73 and port 86 (see Figure 4). It will then pass in the space between the intermediate piston 78 and the upper piston 77 and leave said valve through a port 89 and pipe 90 leading to the head end of the cylinder 30. This will horizontally swing the elevating conveyer and gathering mechanism of the loading machine in one direction, in an obvious manner. As fluid enters the head end of said cylinder under pressure, it is exhausted from the piston rod end of said cylinder through a pipe 91, which leads to a port 92 in the valve 74. From there fluid will pass in the space between the intermediate piston 78 and the lower piston 77 and through the passageway 85 to and through the central passageway 80. Fluid will pass through the passageway 80 to the end passageway 84 and the valve 75. Fluid will leave said valve through a port 93 and pipe 94. From said pipe, fluid will pass through a reduced return valve 95 to the head ends of the cylinders 19, 19, and elevate the elevating conveyer and gathering and loading element in an obvious manner.

When it is desired to swing the elevating conveyer and gathering mechanism of the machine from side to side, while it is in a fixed position vertically, the valve 75 is in a neutral position. The stem 76 of the valve 74 is then raised to cause fluid to flow through the port 92 and pipe 91 to the piston rod end of the cylinder 30 and to enter said valve from the head end of said cylinder through the pipe 90 and port 89, or said stem is moved to the down position shown in Figure 4, to cause a reversal in the flow of fluid through said pipes and valve. Fluid is exhausted from said valve and returned to the tank 71 through the passageways 84 or 85, depending upon the position of said valve stem, and through the opening 79 in the stem of the valve 75 and out through the pipe 88.

In a like manner, when it is desired to elevate or lower the front or elevating conveyer, while held from lateral movement, the valve 74 is in a neutral position while the valve 75 is moved to an up or down position, depending upon the direction it is desired to move said elevating conveyer. During this operation, the return will be through either of the pipes 94 or 96 and out the pipe 88.

The reduced return valve 95 is an ordinary check valve with a by-pass 95a therein, so arranged that fluid under pressure will pass through said valve to the head ends of the cylinders 19, 19 at a normal rate, but when returning will only flow through the restricted by-pass 95a to retard the flow of fluid in a return direction as it is being exhausted from the head ends of said cylinders, and decrease the speed of lowering of the elevating conveyer and resist downward movement of said elevating conveyer when floating on the ground.

At the same time fluid enters the head ends of the cylinders 19, 19, it will be forced from the piston rod ends of said cylinders through a pipe 96 having connection with a port 97 of the valve 75. Fluid will then pass in the space between the pistons 78 and 77 and out the pipe 88 to the tank 71.

If the valve 75 is in the up position shown in Figure 4, fluid will pass to the head ends of the cylinders 19, 19 to raise the forward end of the elevating conveyer, but if said valve is moved to an extreme down position, fluid will pass through the passageways 80 and 85 through the space between the lower cylinder 77 and the intermediate cylinder 78 and through the port 97 and pipe 96 to the piston rod ends of the cylinders 19, 19. At the same time fluid will pass from the head ends of said cylinders through the reduced return valve 95 and the pipe 94 to the port 93 of the valve 75. From said port, fluid will pass to the tank 71 through the return pipe 88.

The relief valves 82 and 83 are connected in the system to relieve pressure upon overload of the cylinders 19, 19 or the cylinder 30, or upon overload of both the cylinders 19, 19 and the cylinder 30. The relief valve 82 has connection with the pipe 73 between the pump 69 and the pressure side of the operating valve 74. A pipe 99 is provided to connect said valves in series, and a connection is provided between this pipe and the pipe 81 leading from the valves 74 and 75, it being noted that said last mentioned pipe is on the pressure side of the valve 75.

Since the cylinders 19, 19 are operated through the exhaust side of the cylinder 30, when all of said cylinders are operated together, the amount of pressure passing through the pipe 73 must be greater than the pressure required to operate the cylinder 30 or the cylinders 19, 19 alone. The reason is that the first cylinder is operated against a back pressure sufficient to operate the second cylinder. Thus if only one relief valve were provided in the system, the cylinders 19, 19 and the cylinder 30 would have to be either operated separately or simultaneously, depending upon the pressure at which the relief valve is set to release, it being obvious that a relief valve could not be placed in each pressure line without by-passing pressure from the second cylinder upon overload of the first cylinder.

With the present arrangement, the relief valve 82 is connected from the pressure line 73 across the valve 74, to the exhaust side of said valve. The relief valve 83 is connected with the pressure and exhaust sides of the valve 75. Said relief valves are both balanced differential pressure valves of a usual construction. When the cylinder 30 is operated separately and is overloaded, overload pressures on either end of said cylinder will be relieved through the valve 82 connected between the line 73 and the exhaust side of the pressure valve 74. Overload conditions of the cylinders 19, 19 will be taken care of by the relief valve 83, connected between the pressure and exhaust sides of the valve 75. When, however, the cylinders 19, 19 and the cylinder 30 are operating simultaneously and are overloaded, fluid under pressure will be released from the line 73 through the valves 82 and 83. The relief valve 82 is opened by fluid entering said valve from the pressure pipe 73 and passing through a passageway 98 in said relief valve, to exert a pressure on the lower side of a piston 100 of said valve. In order to prevent opening of said valve when the cylinders 19, 19 and the cylinder 30 are operating together under normal load conditions, fluid under pressure is supplied to the end of said piston 100 opposite from the passageway 98 through a passageway 99a in said valve, which is connected with the pipe 99. This balances the pressure of fluid coming from the pipe 73 and permits the valve spring to hold said valve in a closed position until the pressure differential between the passageways 98 and 99a is sufficient to move said piston 100 against the valve spring. When this differential in pressure is greater than the pressure of the valve spring, said relief valve will open, to release pressure through the pipe 99 to and through the relief valve 83 to the return. There is no appreciable back pressure on the relief valve 83 since the discharge side of said valve is connected directly with the return line 88 and said valve will open whenever the pressure in the pipe 81 exceeds the pressure at which said valve is set to open.

In Figure 6 the hydraulic fluid pressure actuating devices are shown in position to permit the elevating conveyer to float on the rails during transportation, or to follow an uneven bottom during loading. In order to permit said elevating conveyer to do this, a petcock 107 is provided. This petcock connects the pipe 96 with the return pipe 88 and is normally closed, but is opened when it is desired that the elevating conveyer float along the ground or the rails. When the control valves are in a floating position the valve 74 is moved to a neutral position and the valve 75 is moved to an extreme down position. When the valve 75 is in this position, the open petcock 107 will by-pass fluid to the return pipe 88. A small trickle of fluid, however, passing through the valve 75 will enter the pipe 96 and the piston rod ends of the cylinders 19, 19. This fluid will tend to exert pressure on the piston rod ends of said cylinders and hold the elevating conveyer in floating engagement with the ground, the return of fluid from the head ends of the cylinders 19, 19 through the reduced return valve 95 being restricted by the restricted passageway 95a, to retard downward movement of said elevating conveyer. This maintains a slight amount of fluid pressure in both the head and piston rod ends of the cylinders 19, 19, holding the forward end of said elevating conveyer in floating engagement with the ground and permitting elevation or lowering of said elevating conveyer with respect to the ground as irregularities are encountered, so said elevating conveyer may follow an uneven bottom. The valve 75 is held in a floating position by means of the detent 105 engaging the groove 108.

The cylinders 19, 19 may be used to raise the front wheels of the truck supporting the loading machine, to permit the machine to be readily re-railed at times when it accidentally runs off the track. In re-railing the machine, the petcock 107 is closed and the valve 75 is moved to an extreme down position, the valve 74 being in a neutral position. Fluid will thus enter said valve through the passageway 80 and the space between the lower pistons 77, 77 and the intermediate piston 78 and pass through the pipe 96 to the piston rod ends of the cylinders 19, 19. This will engage the forward end of the gathering and loading element with the ground to lift the front track wheels about the rear track wheels, thus lifting the entire front part of the machine and permitting it to be replaced on the rails. If desired, the machine may be swung from side to side when the front track wheels are in a raised position, by means of the cylinder 30 in the hereinbefore described manner.

When it is desired to hold the front conveyer off of the ground while traveling, the valve 75 is placed in a neutral position when said conveyer reaches the desired position of vertical adjustment, to hold pressure in the head ends of the cylinders 19, 19. The petcock 107 may be either open or closed.

It may be seen from the foregoing that the fluid pressure system is so arranged that the elevating conveyer may be used for lifting the front end of the machine about the rear track wheels to permit the machine to be rerailed, and that said conveyer may also float along the ground during the loading operation or along the rails during transportation, thus providing a readily maneuverable machine operable in a simple and efficient manner and arranged to reduce the hazards of operation underground.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a loading machine, a truck, an elevating conveyer mounted on said truck for vertical and lateral swinging movement with respect thereto, a fluid pressure cylinder and piston for raising or lowering said elevating conveyer with respect to said truck, another fluid pressure cylinder and piston for swinging said elevating conveyer from side to side, a pump, a tank, a pair of control valves arranged in series for controlling operation of said cylinders and pistons, a pressure pipe leading from said pump to said valves, pressure pipes leading from said valves to the head and piston rod ends of said fluid pressure cylinders, and means permitting said elevating conveyer to float along an uneven bottom including a manually controllable by-pass connection in the pipe leading to one end of the elevating cylinder, to by-pass fluid from said end of said cylinder, but permitting a small trickle of fluid under pressure to enter said end of said elevating cylinder, and other means restraining the exhaust of fluid from the other end of said elevating cylinder.

2. In a loading machine, a truck, an elevating conveyer mounted on said truck for vertical and lateral swinging movement with respect thereto, a fluid pressure cylinder and piston for raising or lowering said elevating conveyer with respect to said truck, another fluid pressure cylinder and piston for swinging said elevating conveyer from side to side, a pump, a tank, a pair of control valves arranged in series for controlling operation of said cylinders and pistons, a pressure pipe leading from said pump to said valves, pressure pipes leading from said valves to the head and piston rod ends of said fluid pressure cylinders, and means permitting said elevating conveyer to float along an uneven bottom including a by-pass connection in the pipe leading to one end of the elevating cylinder, to by-pass fluid from said end of said cylinder, but permitting a small trickle of fluid under pressure to enter said end of said elevating cylinder, a valve in said by-pass line manually operable to open or close said by-pass line, and a reduced return valve in the return from said elevating cylinder, restraining the flow of fluid from the other end of said elevating cylinder.

3. In a loading machine of the class described, a mobile truck, an inclined elevating conveyer pivoted to said truck for vertical adjustment with respect thereto about its rear end, a double acting fluid pressure cylinder and piston for raising or lowering the forward end of said elevating conveyer with respect to the ground, a pump for supplying fluid under pressure to said cylinder and piston, a control valve for selectively controlling the admission and release of fluid to the head and piston rod ends of said cylinder and piston, and means to cause the forward end of said elevating conveyer to float along an uneven bottom during loading and transportation of the machine including a by-pass valve having connection with one end of said elevating cylinder, and selectively operable to by-pass fluid from said end of said cylinder, but to permit a small trickle of fluid under pressure to enter said end of said elevating cylinder so as to maintain a yieldable force thereon, to tend to yieldably engage the forward end of said elevating conveyer with the ground.

4. In a loading machine of the class described, a truck, an inclined elevating conveyer transversely pivoted to said truck for vertical adjustment with respect thereto about its rear end, a double acting fluid pressure cylinder and piston for raising or lowering the forward end of said elevating conveyer about its axis of connection to said truck, a pump for supplying fluid under pressure to said cylinder and piston, a control valve for selectively controlling the admission and release of fluid to the head and piston rod ends of said cylinder and piston, and means to cause the forward end of said elevating conveyer to float along an uneven bottom during loading and transportation of the machine including a by-pass valve having connection with the end of said elevating cylinder which controls the lowering of the forward end of said elevating conveyer, and manually operable to by-pass fluid from said end of said cylinder, but to permit a small trickle of fluid under pressure to enter said end of said elevating cylinder, so as to maintain a pressure thereon sufficient to maintain the forward end of said elevating conveyer in yieldable engagement with the ground.

5. In a loading machine of the class described, a truck, an inclined elevating conveyer transversely pivoted to said truck for vertical adjustment wtih respect thereto about its rear end, yieldable means for cushioning downward movement of said elevating conveyer, a double acting fluid pressure cylinder and piston for raising or lowering the forward end of said elevating conveyer with respect to the ground, a pump for supplying fluid under pressure to said cylinder and piston, a control valve for selectively controlling the admission and release of fluid to the head and piston rod ends of said cylinder and piston, and means to cause the forward end of said elevating conveyer to float along an uneven bottom during loading and transportation of the machine including a by-pass valve having connection with the end of said elevating cylinder which controls the lowering of the forward end of said elevating conveyer, and manually operable to by-pass fluid from said end of said cylinder, but to permit a small trickle of fluid under pressure to enter said end of said cylinder, so as to react against said yieldable means and maintain the forward end of said elevating conveyer in yieldable engagement with the ground.

6. In a loading machine of the class described, a truck, an inclined elevating conveyer engageable with the ground at its forward end and pivotally mounted on said truck for vertical adjustment with respect thereto about its rear end, a double acting fluid pressure cylinder and piston for raising or lowering the forward end of said elevating conveyer with respect to the ground, a pump for supplying fluid under pressure to said cylinder and piston, a control valve for controlling the admission and release of fluid to the head and piston rod ends of said cylinder and piston, and means to cause the forward end of said elevating conveyer to float along an uneven bottom during loading and transportation of the machine including a by-pass valve having connection with the end of said elevating cylinder which controls the lowering of the forward end of said elevating conveyer, and manually operable to by-pass fluid from said end of said cylinder, but to permit a small trickle of fluid under pressure to enter said end of said elevating cylinder, so as to maintain a slight pressure thereon sufficient to maintain the forward end of said elevating conveyer in yieldable engagement with the ground, and a reduced return valve in the return from the end of said cylinder which supplies pressure to elevate said elevating conveyer, for restraining the flow of fluid from said last mentioned end of said cylinder and maintaining a slight pressure thereon to aid in balancing the pressure on the other end of said cylinder.

7. In a loading machine of the class described, a truck, an inclined elevating conveyer engageable with the ground at its forward end and pivotally mounted on said truck for vertical adjustment with respect thereto about its rear end, yieldable means for cushioning downward movement of said elevating conveyer, a double acting fluid pressure cylinder and piston for raising or lowering the forward end of said elevating conveyer with respect to the ground, a pump for supplying fluid under pressure to said cylinder, a control valve for controlling the admission and release of fluid to the head and piston rod ends of said cylinder and piston, and means to cause the forward end of said elevating conveyer to float along an uneven bottom during loading and transportation of the machine including a by-pass valve having connection with the end of said elevating cylinder which controls the lowering of the forward end of said elevating conveyer, and manually operable to by-pass fluid from said end of said cylinder, but to permit a small trickle of fluid under pressure to enter said end of said elevating cylinder, so as to react against said yieldable means and maintain the forward end of said elevating conveyer in yieldable engagement with the ground, and a reduced return valve in the return from the end of said cylinder which supplies fluid under pressure to elevate said elevating conveyer, for restraining the flow of fluid from said last mentioned end of said cylinder and maintaining a slight pressure thereon in the direction of the action of said yieldable means.

WILLIAM W. SLOANE.